C. C. GATES.
ENDLESS BELT.
APPLICATION FILED MAR. 18, 1919.
1,400,539.
Patented Dec. 20, 1921.
2 SHEETS—SHEET 1.
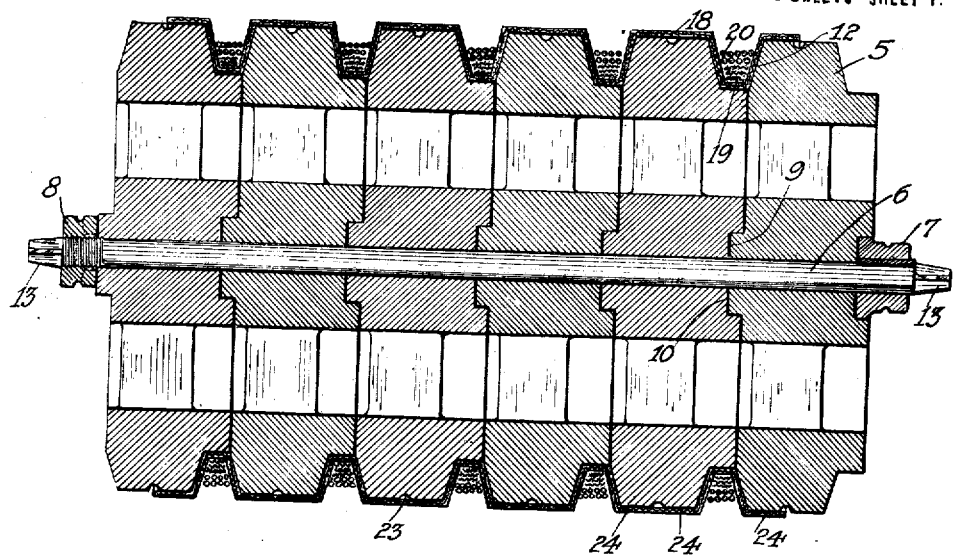
Fig. 1.
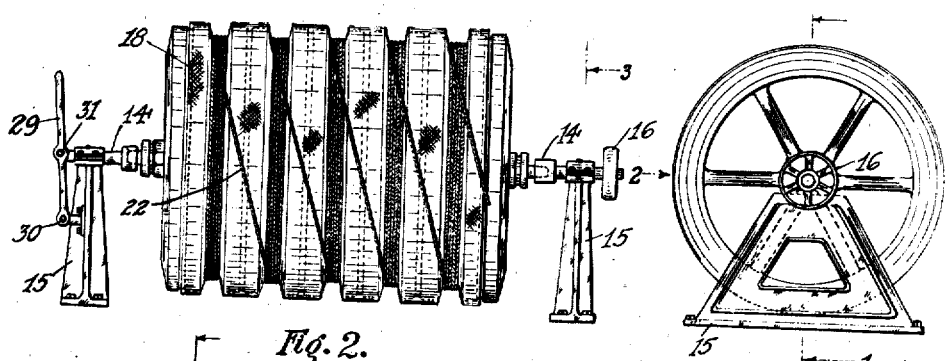
Fig. 2.
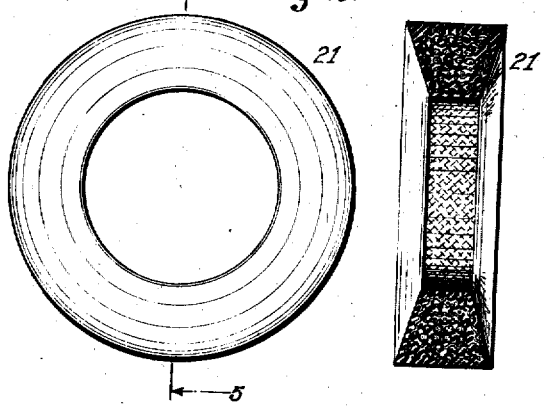
Fig. 4. Fig. 5.
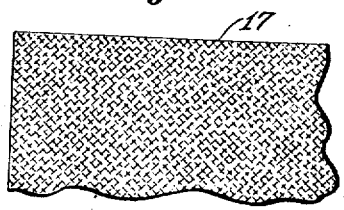
Fig. 3.
Fig. 6.
Inventor
Charles C. Gates.
By
Attorney C. C. GATES.
ENDLESS BELT.
APPLICATION FILED MAR. 18, 1919.
1,400,539.
Patented Dec. 20, 1921.
2 SHEETS—SHEET 2.
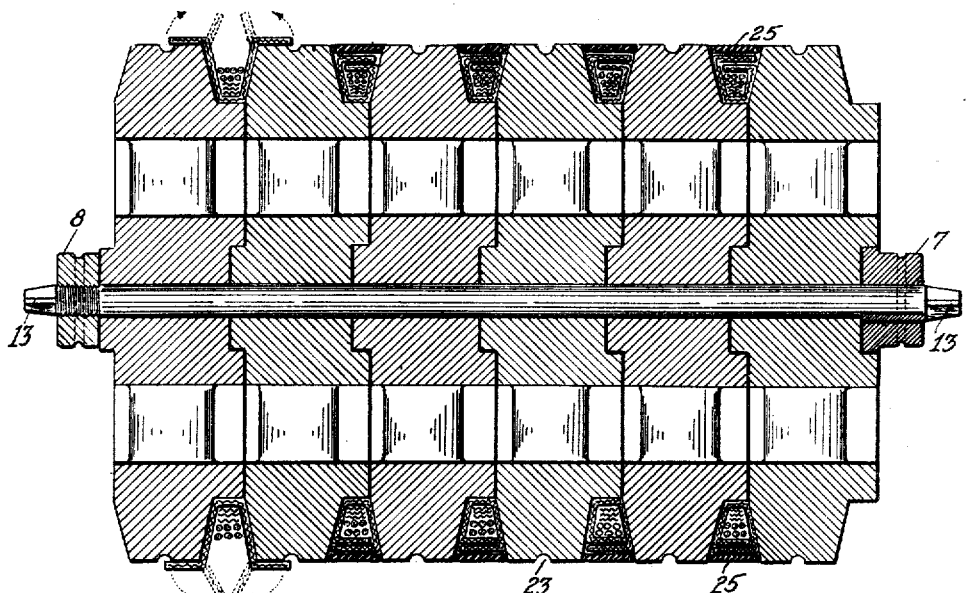
Fig. 7.
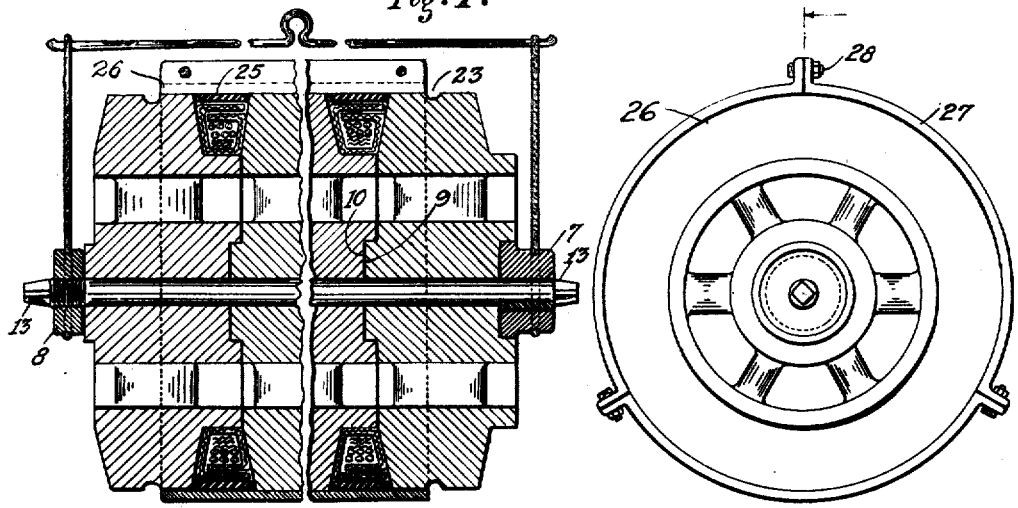
Fig. 8.   Fig. 9.
Charles C. Gates. Inventor

UNITED STATES PATENT OFFICE.

CHARLES C. GATES, OF DENVER, COLORADO.

ENDLESS BELT.

1,400,539.  Specification of Letters Patent.  Patented Dec. 20, 1921.

Application filed March 18, 1919. Serial No. 283,335.

*To all whom it may concern:*

Be it known that I, CHARLES C. GATES, a citizen of the United States, residing at the city and county of Denver and State of Colorado, have invented certain new and useful Improvements in Endless Belts; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in endless belts in which rubberized cords, or other suitable material, constitutes the structural element, or the element which gives strength or backbone to the belt, while the wearing feature of the belt consists of rubberized fabric and rubber. or rubber compound, as hereinafter more fully described.

In the drawing I have illustrated a suitable apparatus for manufacturing belts of this character. In this drawing:

Figure 1 is a section taken on the line 1, Fig. 3, through a battery or series of circular elements connected to form an approximately cylindrical member containing V-shaped cavities for determining the shape of the belt, shown on a larger scale.

Fig. 2 is an elevation shown on a smaller scale, showing the said member mounted to rotate, as is required in manufacturing these belts.

Fig. 3 is an end elevation of the same, or a view looking in the direction of arrow 3 Fig. 2.

Fig. 4 is a side elevation of one of the belts.

Fig. 5 is a section of the same taken on the line 5, Fig. 4.

Fig. 6 illustrates a sheet of fabric employed in the manufacture of these belts, and whose warp and woof are arranged diagonally to the length of the belt.

Fig. 7 is a view similar to Fig. 1, but showing, except in one instance, the belts completed.

Fig. 8 shows the cylindrical belt member broken between its extremities, and ready to be placed in the vulcanizer. This is a section taken on the line 8, Fig. 9.

Fig. 9 is an end elevation of the cylindrical member with the outer casing applied preparatory to vulcanizing the belts which have been formed on the cylindrical member.

The same reference characters indicate the same parts in all the views.

Let the numeral 5 designate each of a number of circular members which are mounted on a shaft, 6, and connected by a stop, 7, near one end of the shaft, and a nut, 8, at the opposite end, the said members being interlocked by means of lugs, 9, formed thereon, and entering recesses, 10, of counterpart shape, formed in the adjacent members. The peripheries of the members 5 are so fashioned that the cylindrical structure composed of a series of these members contains a number of circular V-shaped cavities, 12, part of one of which is formed in each member 5, so that after the formation of the belts is completed, the latter may be removed from the cylindrical structure by separating the members 5 by simply unscrewing the nut 8 and slipping these members off the shaft.

Assuming that a battery of the elements 5 is mounted on the shaft, 6, and that the extremities, 13, of this shaft, which are polygonal in shape, are inserted in sockets of counterpart shape, formed in journals, 14, supported by uprights, 15, the cylindrical member or structure will be rotatably mounted and may be connected with any suitable power, as a line shaft, through the medium of a pulley, 16, applied to one of these journals. As soon as this element is mounted, one or more sheets of rubberized fabric, whose woven element 17 has its warp and woof extending at oblique angles to the circumference of the drum or cylindrical member, will be applied to the drum, which may be rotated for the purpose, during which the said sheet or sheets of rubberized fabric will be pressed into the circular V-shaped cavities, 12, of the drum, this rubberized fabric being indicated in the drawing by the numeral 18, the direction of its warp and woof being indicated by the small areas of shading in Fig. 2, and on the inner circumference of the belt in Fig. 5. When this rubberized fabric is applied to the drum, as just explained, it will extend beyond the end cavities and between the intermediate cavities. One or more layers, 19, of rubberized fabric may then be placed in the bottom of each groove and in contact with the initial layer or layers, after which one or more cords, 20, may be placed within the cavity outside of the fabric layers, 19, these cord convolutions, one or more, being parallel with the length of the cavity and consequently parallel with the length of the belt 21 when the latter is completed.

One method of applying the cords 20 to the drum is illustrated in Fig. 2, where, assuming that the drum is rotated, one end of the cord must be placed in contact with the outer fabric layer, 19, and as the drum is rotated, the proper number of convolutions will soon be placed in the first V-shaped cavity, and as soon as this is done, the cord will be crossed over to the next cavity, as indicated at 22; and this operation will be continued until all the V-shaped cavities are supplied with one or more convolutions of the cord. As soon as this is done, the fabric and the diagonally arranged portions, 22, of the cord will be cut midway between the intermediate cavities by inserting knives in such position that their points will enter small circumferential grooves, 23, formed in the drum elements. As soon as these cuts are made, the exposed ends of the cords will be properly placed in the cavities, after which the portions 24 of the rubberized fabric, which are in contact with the outer surface of the drum, will be folded into the cavities so that there will be two or more layers of this fabric outside of the cord portion, or backbone, of the belt. Layers, 25, of rubber compound may then be placed in the outer portions of the said cavities, as best illustrated in Figs. 7 and 8. A metal casing, 26, will then be applied to the drum, this casing being preferably composed of a number of members, 27, having abutting flanges connected by bolts 28 or other suitable fastening devices. The size of this metal casing is such that there is a slight space—say one-sixty-fourth of an inch in depth, approximately—between the casing and the drum, to permit any excess of rubber compound to overflow into the grooves 23 during the operation of vulcanization. As soon as the vulcanizing process is complete, the drum is removed from the vulcanizer, the casing 26 removed from the drum, and the members 5 detached from the shaft 6 in order to remove the belts from the drum.

In Fig. 8 I have illustrated suitable means for handling the drum for the purpose of transferring it to the vulcanizer and for removing it therefrom. It should be understood, however, that any suitable means to accomplish this purpose may be employed.

Furthermore, in order to detach the drum from the stationary structure illustrated in Fig. 2, I may employ a hand lever, 29, fulcrumed at 30 and pivotally connected as shown at 31 with one end of one of the journals, 14. By properly manipulating this lever, the journal may be moved axially sufficiently to disconnect its socket extremity from the adjacent end of the shaft 6, and also far enough to allow the drum to be shifted endwise sufficiently to disengage its shaft from the socket extremity of the other journal.

It should be understood that the object of so applying the rubberized fabric to the grooves of the drum that the warp and woof of the fabric shall form oblique angles to the direction of the length of the belt is to give the latter a limited degree of elasticity beyond that portion of the belt which may be termed its "neutral axis," to permit the flexing of the belt freely when bending over a pulley and which flexing will not in any way injure the material of the belt.

Instead of cords, I may employ rubberized woven fabric in which one set of threads extends in the direction of the length of the belt, since this element of the belt will then become substantially non-elastic and will perform virtually the same function as the convolution or convolutions of cord. This element of the belt, whether composed of cord or fabric, will form the neutral axis of the belt, or the portion which does not stretch when the belt is in use. It will be understood that when the belt is passing around a small pulley, its outer portion beyond the neutral axis is stretched to some extent, but owing to the fact that the warp and woof of the woven fabric in this portion of the belt form oblique angles to the length of the belt, this portion of the belt is more flexible and more elastic and will not be subject to any injurious stress or tension during the use of the belt, and the latter, due to this fact, will wear longer because any material which is not stressed will better resist abrasion and general wear during the performance of its function.

While the outer portion of the belt, due to the employment of woven rubberized fabric whose warp and woof form oblique angles to its length, is permitted while passing around a small pulley to yield readily without placing the belt under injurious stress or strain, the inner portion of the belt beyond the "neutral axis" is correspondingly compressed, this compression being considerable by reason of the fact that the inner part of the belt is also composed of rubberized fabric whose warp and woof are diagonal to its length, thus providing for a considerable degree of elasticity. This compression of the inner portion of the belt produces a widening or enlargement of the outer face of the belt and causes its inclined sides to grip the adjacent walls of the grooved pulley more tightly, thus preventing the possibility of slipping.

I claim:

1. An endless vulcanized V-shaped belt having rubberized cord embedded therein and lying substantially parallel with the length of the belt, the inclined sides and the inner narrow surface of the belt being composed of rubberized woven fabric whose warp and woof form oblique angles to the length of the belt.

2. An endless vulcanized V-shaped belt having rubberized cord embedded therein and lying substantially parallel with the length of the belt, the inclined sides and the inner narrow surface of the belt being composed of rubberized woven fabric whose warp and woof form oblique angles to the length of the belt, the belt also having a number of layers of woven fabric located between the cord and the inner narrow face of the belt.

3. An endless vulcanized V-shaped belt having rubberized cord embedded therein and lying substantially parallel with the length of the belt, the inclined sides and the inner narrow surface of the belt being composed of rubberized woven fabric whose warp and woof form oblique angles to the length of the belt, the belt also having a number of layers of woven fabric whose warp and woof are diagonal to the length of the belt, located between the cord and the inner narrow face of the belt.

4. An endless vulcanized V-shaped belt having rubberized cord embedded therein and lying substantially parallel with the length of the belt, the inclined sides and the inner narrow surface of the belt being composed of rubberized woven fabric whose warp and woof form oblique angles to the length of the belt, the belt also having a number of layers of woven fabric located between the cord and the inner narrow face of the belt, the outer face of the belt having a layer of rubberized compound.

5. An endless vulcanized V-shaped belt having rubberized cord embedded therein and lying substantially parallel with the length of the belt, the inclined sides and the inner narrow surface of the belt being composed of rubberized woven fabric whose warp and woof form oblique angles to the length of the belt, the belt also having a number of layers of woven fabric whose warp and woof are diagonal to the length of the belt, located between the cord and the inner narrow face of the belt, the outer non-contact surface of the belt having a layer of rubberized compound.

6. A vulcanized V-shaped belt whose opposite inclined side walls are composed of rubberized woven fabric, whose warp and woof form oblique angles to the length of the belt.

7. An endless vulcanized belt, having a rubberized convoluted cord embedded therein and surrounded by rubberized woven fabric whose warp and woof are arranged at oblique angles to the length of the belt, its outer non-contact surface being composed of a layer of rubber compound.

8. An endless vulcanized V-shaped belt having substantially non-elastic cords at its neutral axis and whose opposite inclined side walls are composed of rubberized woven fabric whose warp and woof are diagonal to the length of the belt.

9. An endless vulcanized belt having rubberized cord embedded therein and lying substantially parallel with the length of the belt, the sides and the inner surface of the belt being composed of rubberized woven fabric whose warp and woof form oblique angles to the length of the belt.

In testimony whereof I affix my signature.

CHARLES C. GATES.

DISCLAIMER 1,400,539.—*Charles C. Gates*, Denver, Colo. ENDLESS BELT. Patent dated December 20, 1921. Disclaimer filed January 19, 1931, by the assignee, *The Gates Rubber Company*.

Hereby enters its disclaimer whereby said claims 7 and 9 are limited to a belt which, when in use, engages the adjacent inclined sides of a grooved pulley, the belt not touching the bottom of the groove, so that the belt wedges in the pulley, or to a side-driving belt as distinguished from a flat, face-driving belt, and any broader meaning or interpretation of said claims is hereby disclaimed.

[*Official Gazette February 10, 1931.*]